(12) United States Patent
Steck et al.

(10) Patent No.: US 11,458,876 B2
(45) Date of Patent: Oct. 4, 2022

(54) ROOF HANDLE FOR A VEHICLE

(71) Applicant: HERO GmbH, Ittlingen (DE)

(72) Inventors: Volker Steck, Waldbrunn (DE); Martin Meister, Sinsheim (DE); Milto Benjamin, Guetersloh (DE)

(73) Assignee: HERO GmbH, Ittlingen (DE)

( * ) Notice: Subject to any disclaimer, the term of this patent is extended or adjusted under 35 U.S.C. 154(b) by 0 days.

(21) Appl. No.: 17/480,244

(22) Filed: Sep. 21, 2021

(65) Prior Publication Data

US 2022/0089077 A1     Mar. 24, 2022

(30) Foreign Application Priority Data

Sep. 22, 2020    (DE) .................... 10 2020 124 702.8

(51) Int. Cl.
    *B60N 3/02*        (2006.01)
    *B60Q 3/80*        (2017.01)
    *B60Q 3/267*      (2017.01)
    *B60Q 3/64*        (2017.01)
    *B60Q 3/82*        (2017.01)

(52) U.S. Cl.
    CPC ............. *B60N 3/023* (2013.01); *B60Q 3/267* (2017.02); *B60Q 3/64* (2017.02); *B60Q 3/80* (2017.02); *B60Q 3/82* (2017.02)

(58) Field of Classification Search
CPC ... B60Q 3/64; B60Q 3/80; B60Q 3/82; B60Q 3/267; B60N 3/023; B60N 3/026
See application file for complete search history.

(56) References Cited

FOREIGN PATENT DOCUMENTS

| DE | 29604260 U1 | 4/1996 |
|---|---|---|
| DE | 102009020333 A1 | 11/2010 |

*Primary Examiner* — Thomas M Sember
(74) *Attorney, Agent, or Firm* — Collard & Roe, P.C.

(57) ABSTRACT

A roof handle for a vehicle has two bearing elements which can be fixed to a roof of a vehicle and on which a handle body is mounted so as to be pivotable between a raised position and a lowered holding position. A line for the power supply is provided on at least one bearing element, which line, in a raised position of the handle body, is connected via contacts to an illuminating means on the handle body. Light can be irradiated via the illuminating means into an optical waveguide. This makes the handle body more visible in poor lighting conditions.

11 Claims, 7 Drawing Sheets

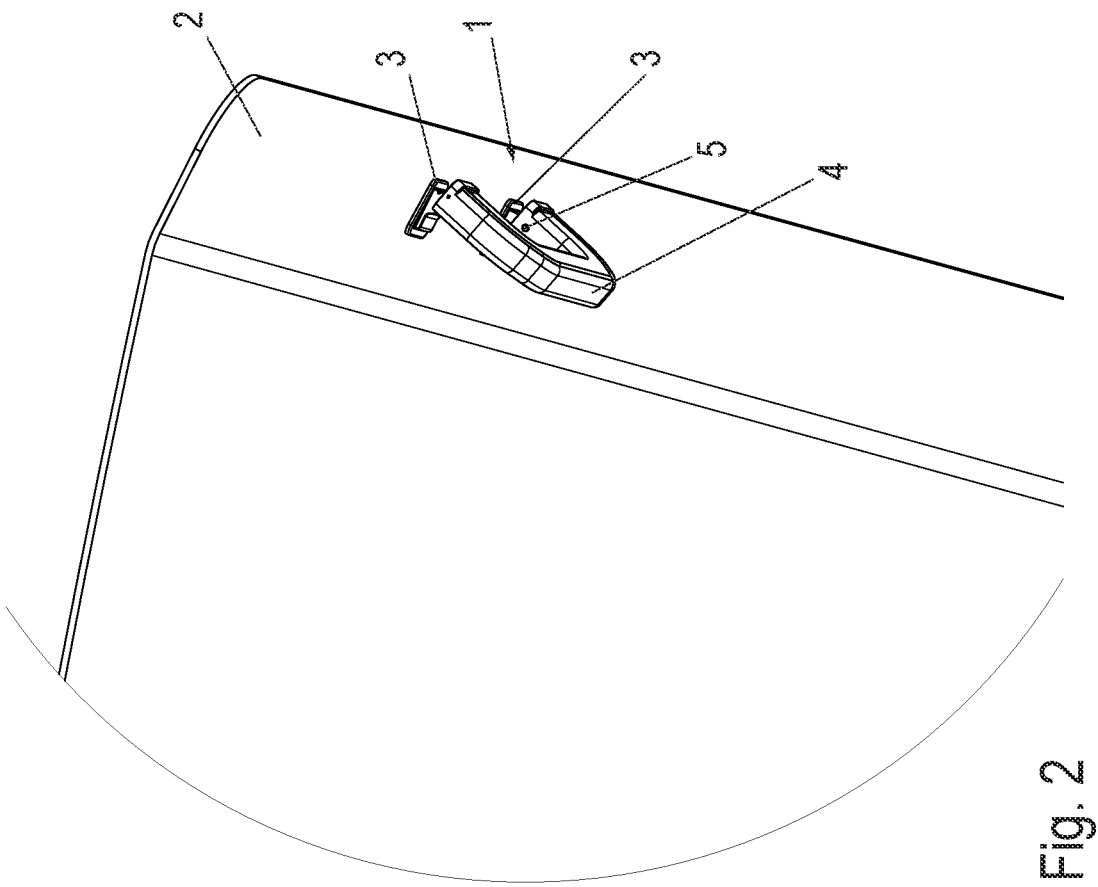
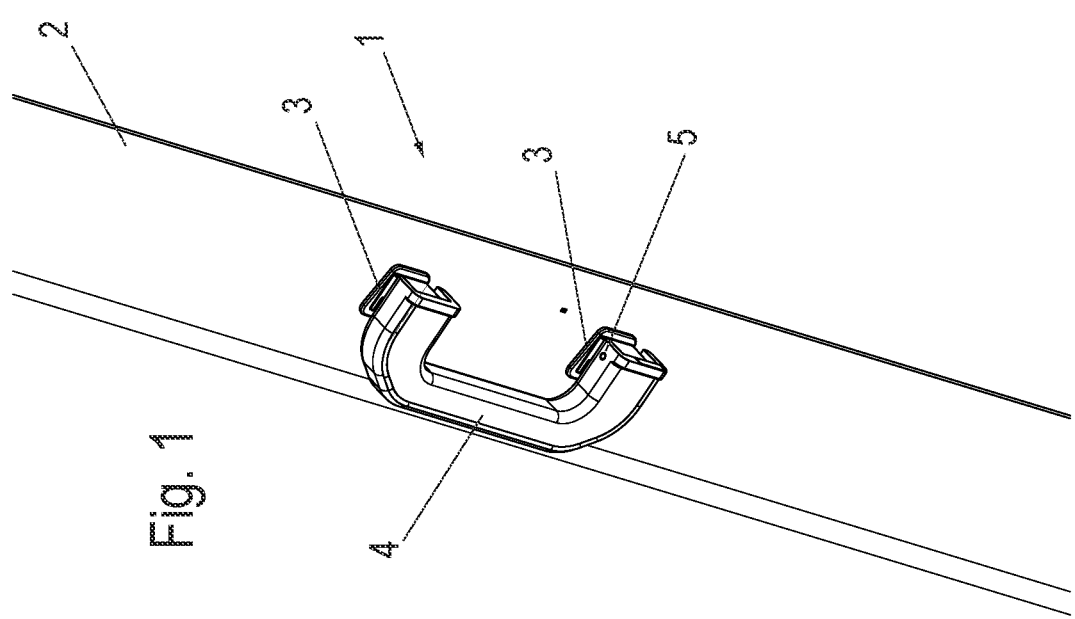

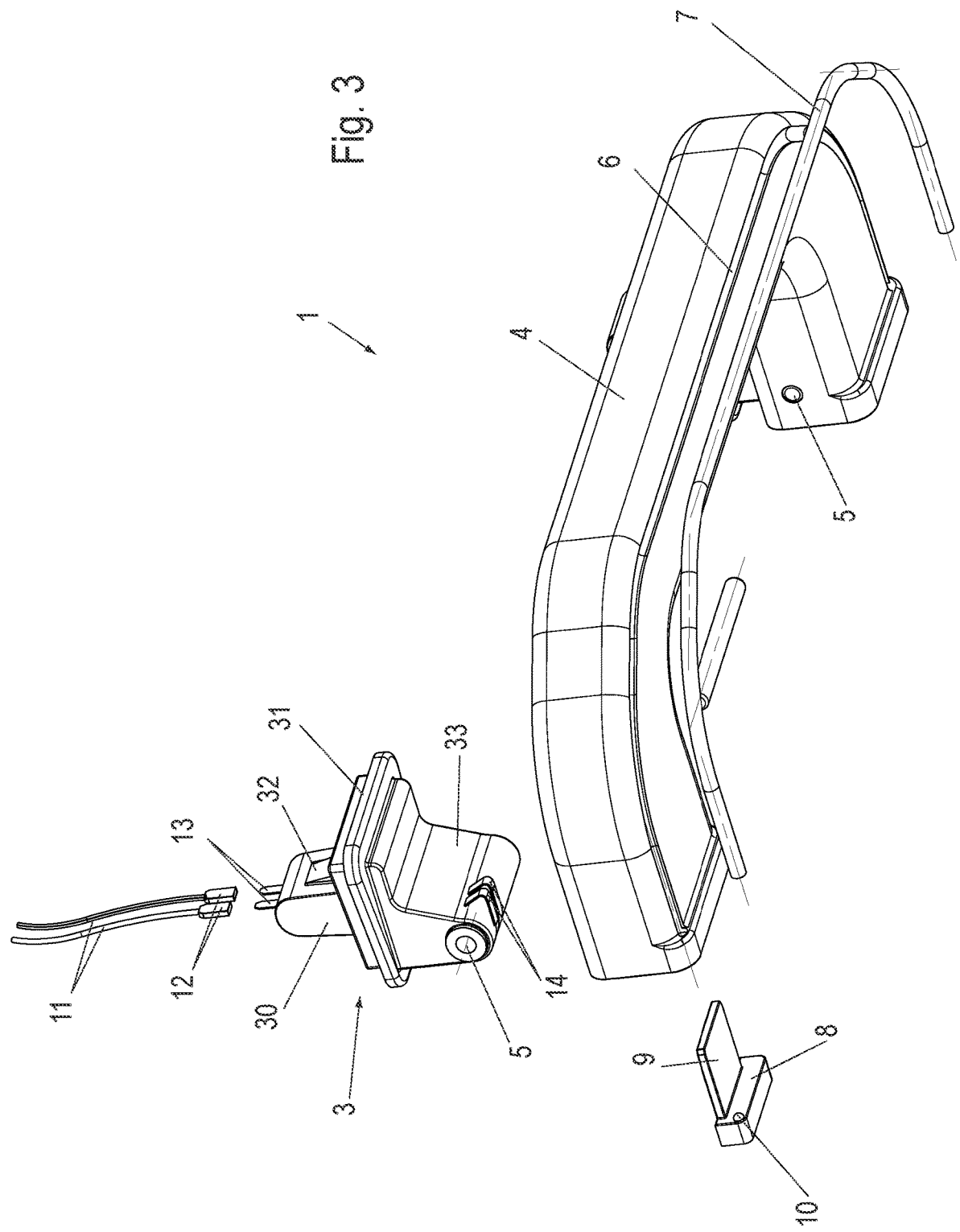

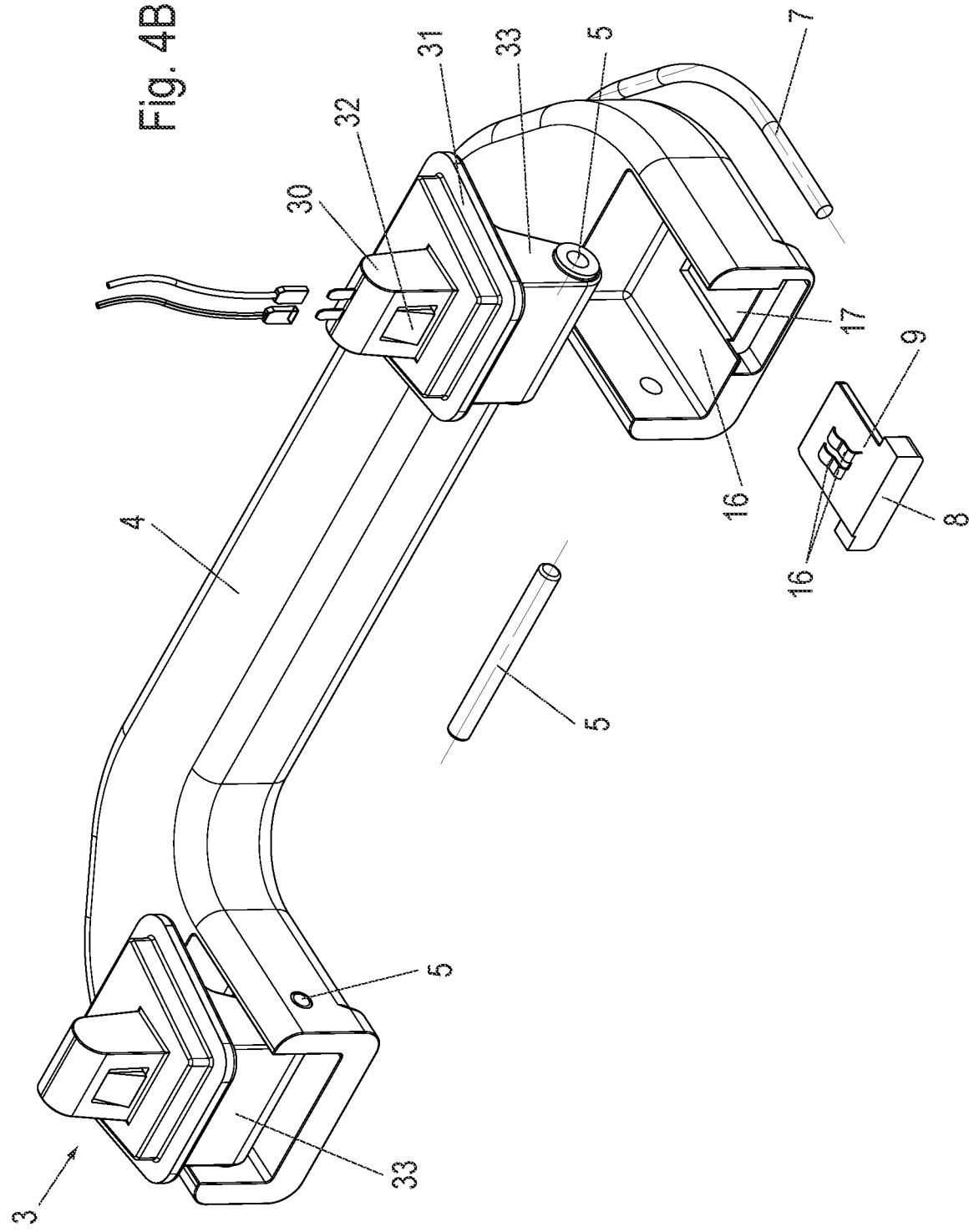

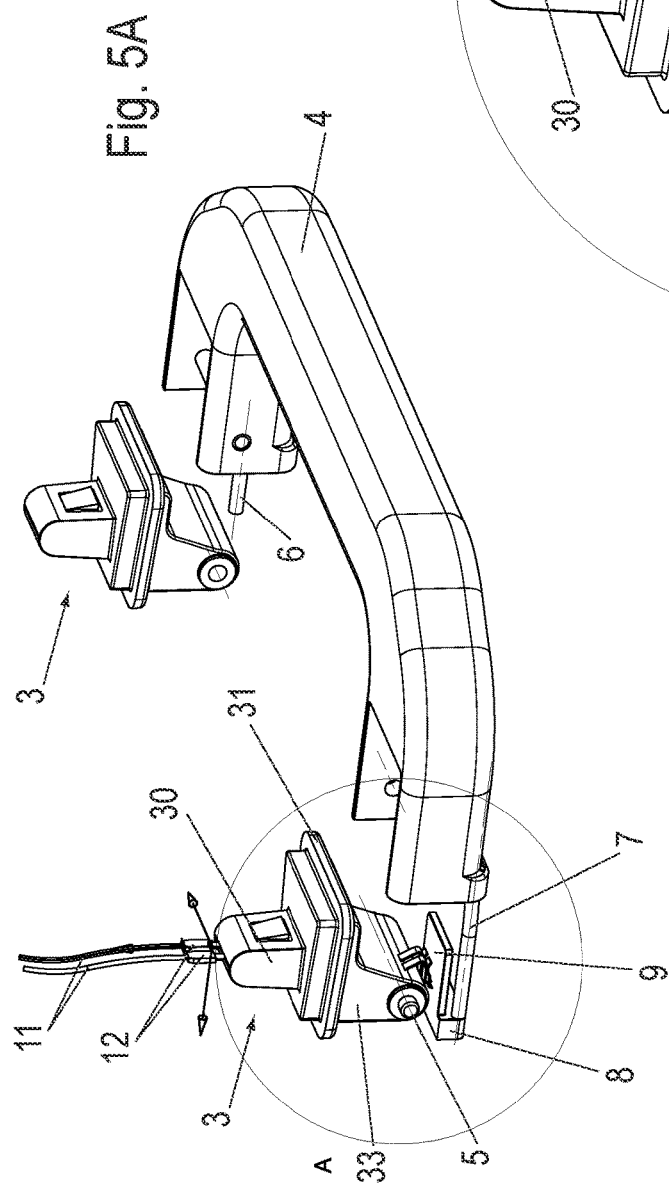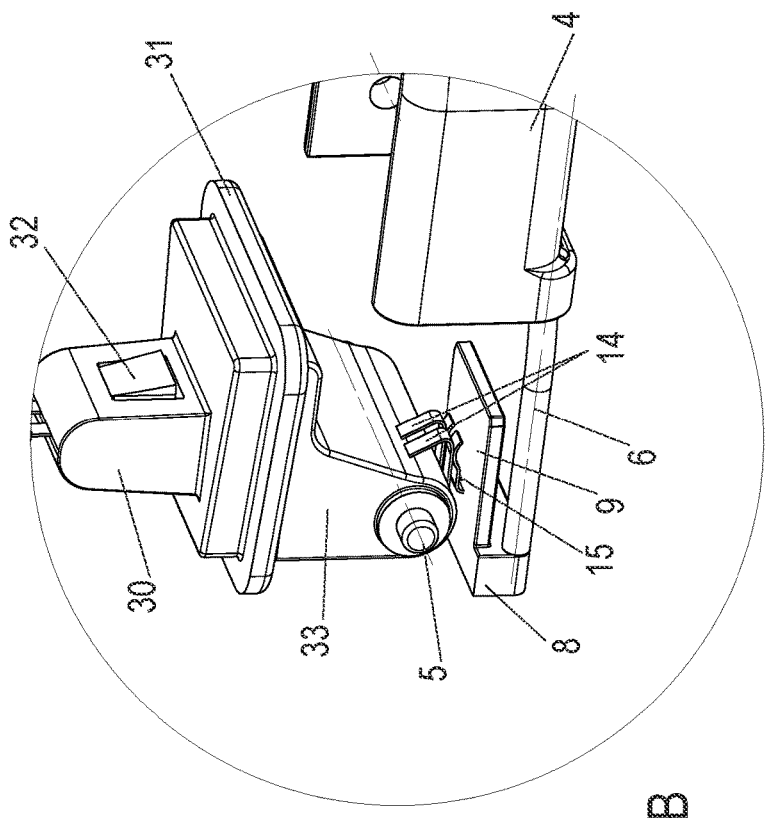

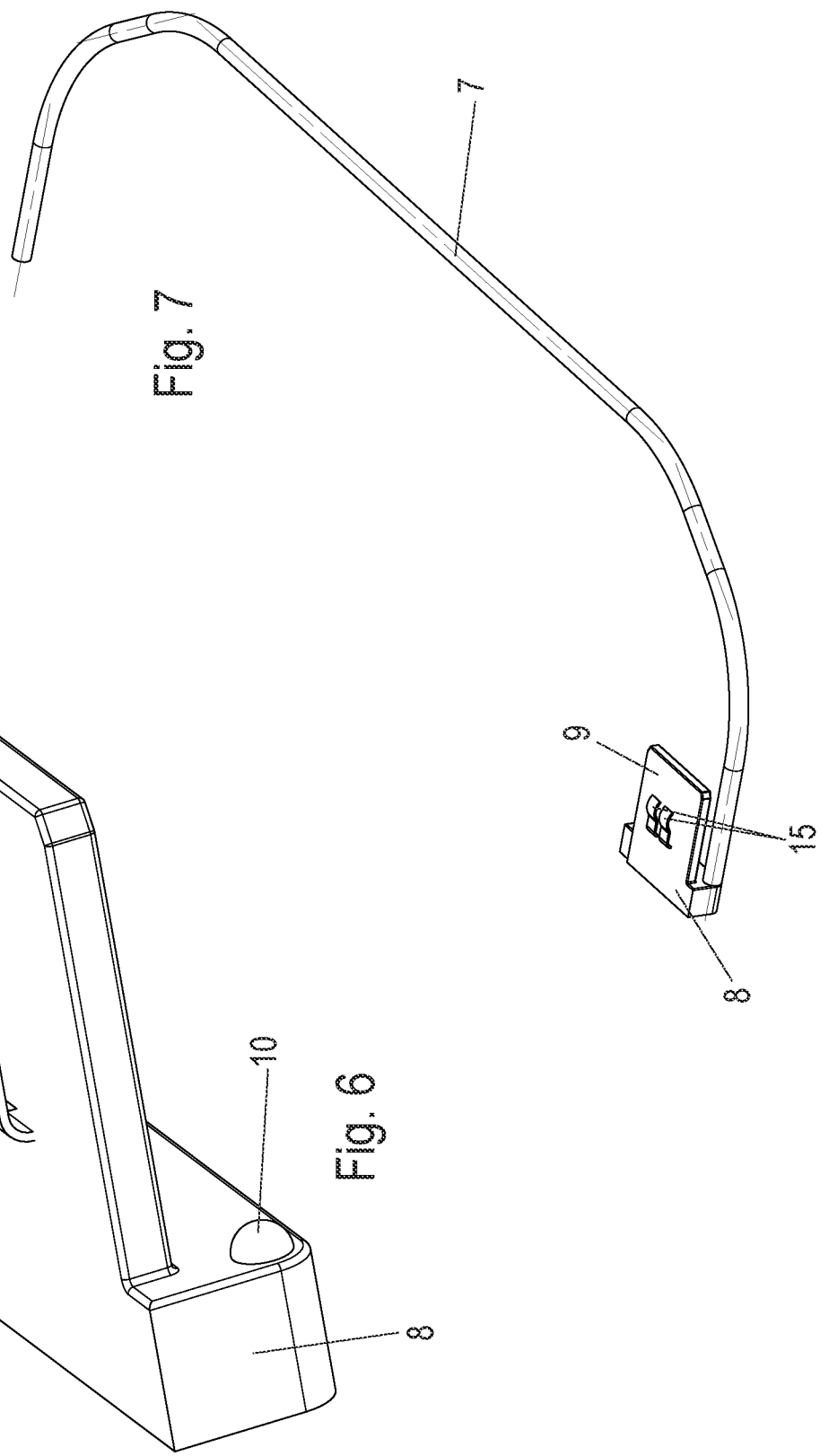

ROOF HANDLE FOR A VEHICLE

CROSS-REFERENCE TO RELATED APPLICATIONS

This application claims priority under 35 USC 119 of German Application No. DE 10 2020 124 702.8, filed on Sep. 22, 2020, the disclosure of which is herein incorporated by reference.

BACKGROUND OF THE INVENTION

The present invention relates to a roof handle for a vehicle, having two bearing elements which can be fixed to a roof of a vehicle and on which a handle body is pivotably mounted between a raised position and a lowered holding position.

DE 296 04 260 U1 discloses a roof handle which has a swiveling grab handle which is pivotably held on two bearing blocks. The handle is moved into the raised starting position by means of a spring. Such roof handles have proven their worth as entry and exit aids. In poor lighting conditions, however, the vehicle occupant may not be able to see the position of the roof handle and must first feel for it.

DE 10 2009 020 333 A1 discloses a motor vehicle in which a light source is provided on a headliner, a fixed roof rail or a pillar trim. Such stationary lighting in the vehicle can, in particular, illuminate the surface of the vehicle door below and a lower threshold, so that better lighting conditions prevail when entering and exiting the vehicle. However, the directed downward emission of light may cause glare to the occupants of the vehicle. In addition, the handle bodies protruding into the vehicle compartment are disadvantageous.

SUMMARY OF THE INVENTION

It is therefore an object of the present invention to provide a roof handle for a vehicle which is convenient to use and easy to see even in low light conditions. In addition, the interior is to be visually upgraded.

This task is solved with a roof handle according to the invention, which can be fixed to a roof of a vehicle and on which a handle body is mounted such that it can be pivoted between a raised position and a lowered holding position. A line for the power supply is provided on at least one bearing element, which line, in a folded-up position of the handle body, is connected via contacts to an illuminating means on the handle body, via which illuminating means light can be irradiated into an optical waveguide.

In the roof handle according to the invention, a handle body is pivotably mounted between a folded-up position and a folded-down holding position and is thus convenient to use. In particular, the handle body does not protrude into the vehicle interior in the folded-up position. A line for supplying power is provided on at least one bearing element, which line, in a folded-up position of the handle body, is connected via contact elements to a lighting means on the handle body, via which light can be irradiated into an optical waveguide. As a result, the handle body can be at least partially illuminated via the illuminating means and the optical waveguide in low light conditions, which makes it easier for the vehicle occupants to detect the position of the handle body and then to grip it. In addition, the illumination of the optical waveguide results in a pleasant ambient lighting which does not dazzle the vehicle occupants but improves the illumination of the interior.

Preferably, the optical waveguide is arranged in a receptacle of the handle body. This allows the optical waveguide to fit into the contour of the handle body. The optical waveguide may be made of a transparent or translucent material. The illuminating means preferably shines light into an end face of the optical waveguide, which is then visible at the surface to the vehicle occupant, wherein the optical waveguide may also be arranged along the handle body in a curved or bent manner. Preferably, the optical waveguide extends along at least 50% of the length of the handle body.

For a reliable power supply, at least one sliding contact is provided on at least one bearing element, which sliding contact is in contact with a movable contact which is fixed to the handle body. Via the contacting of the movable conductive contact by the sliding contact, an electrical connection can be established in order to supply the illuminating means with current. The movable contact may thereby be arranged on a printed circuit board to which a lighting means, in particular an LED, is fixed. The printed circuit board may be inserted in a receptacle on the handle body, so that the position of the illuminating means is predetermined via the printed circuit board. This enables simple assembly with only a few components.

According to an alternative embodiment, a cable bushing is provided on the at least one bearing element and the line for the power supply is connected to a printed circuit board on the handle body via a contact element. Such a contact element may be in the form of a plug-in contact, a substance-to-substance contact or a clamping contact. This embodiment variant thus does not require a sliding contact and is advantageous for a continuous current supply to the illuminating means.

Preferably, the illuminating means can be switched off by folding down the handle body. Preferably, the switching is performed by interrupting the connection between the at least one sliding contact and the movable contact. Switching the illuminating means prevents the illuminating means from interfering when the handle is folded down. Optionally, by folding down the handle, a further contact element can be supplied with current in order to supply current to another illuminating means or to change the color of the illuminating means when the handle is folded down. This provides a visual indication of whether the handle is in the raised position or a lowered position. Alternatively, such switching of the illuminating means can be omitted. A continuous power supply is also possible.

In a further embodiment, the optical waveguide is circular in cross-section. The optical waveguide can be manufactured as a separate component and inserted into a receptacle of the handle body, for example by gluing or overmoulding. Optionally, the optical waveguide may also be integrally formed with the handle body. Preferably, the optical waveguide is arranged in a bow-shaped manner on the handle body and may extend along an edge of the handle body in order to be laid according to the contour of the handle body. The optical fiber may also extend flush with the surface of the inner surface of the handle facing away from the occupant. In this design, the light can also shine permanently indirectly without glare and illuminate specific functional areas, such as a coat hook or reading light switch.

The handle body may thereby have a groove-shaped receptacle into which the optical waveguide is inserted, preferably inserted substantially flush with the surface, so that a surface of the optical waveguide is arranged substantially flush with the surface of the handle body. The optical waveguide may thereby be made of a flexible plastic material.

BRIEF DESCRIPTION OF THE DRAWINGS

The invention is explained in more detail below with reference to the accompanying drawings by way of an example of an embodiment.

FIG. 1 shows a view of a roof handle in the raised position;

FIG. 2 shows a view of the roof handle of FIG. 1 in a folded down position;

FIG. 3 shows an exploded view of the roof handle of FIG. 1;

FIGS. 4A and 4B show two views of the roof handle of FIG. 1;

FIGS. 5A and 5B show two views of a bearing element of the roof handle prior to assembly;

FIG. 6 shows a detailed view of the printed circuit board with the illuminating means;

FIG. 7 shows a view of the printed circuit board with the optical waveguide.

DETAILED DESCRIPTION OF THE EMBODIMENTS

Figure 4A:
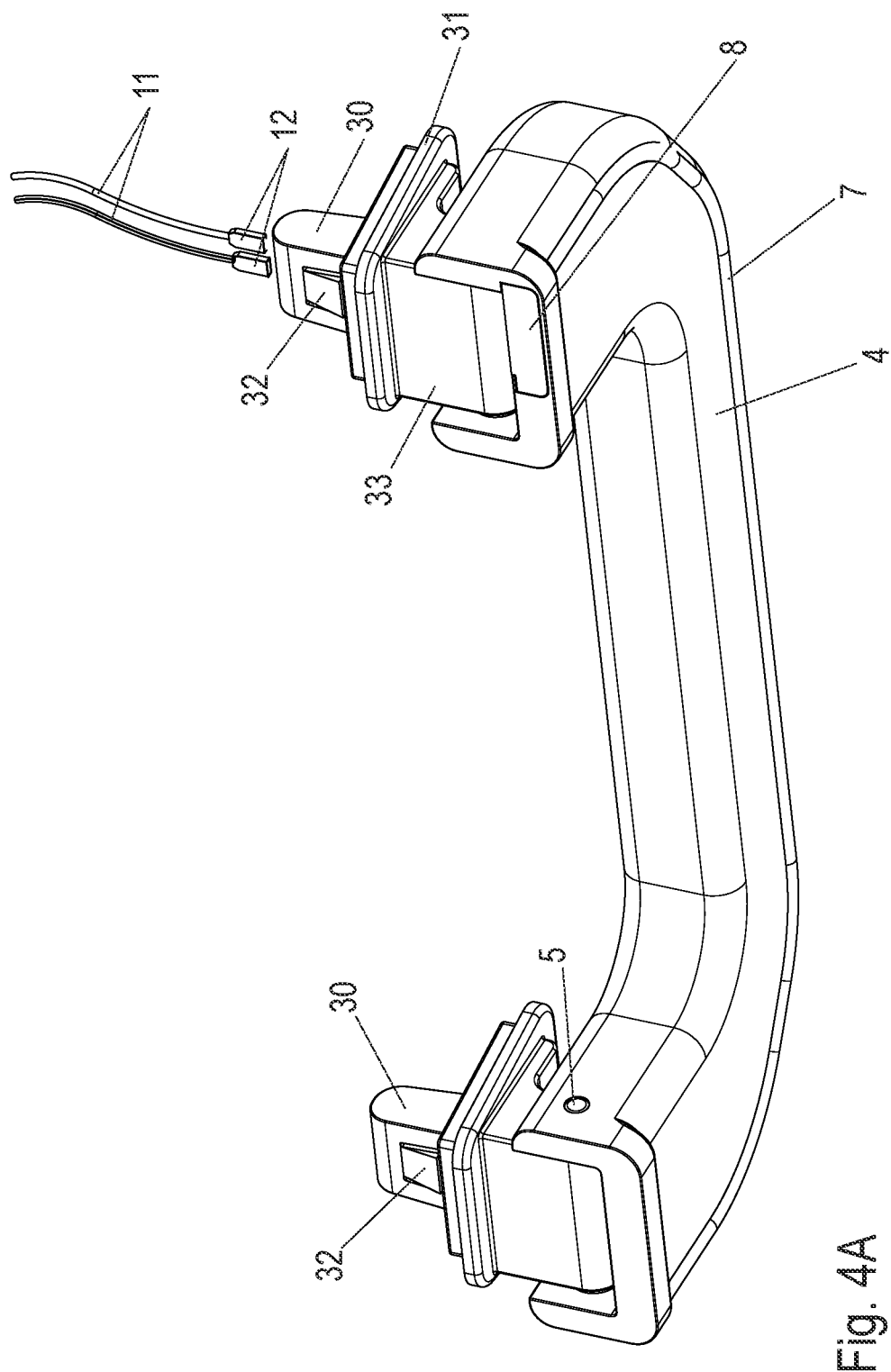

A roof handle 1 is mounted on a roof 2 of a vehicle, wherein the roof handle 1 has two bearing elements 3 which are fixed to the roof 2. A bow-shaped handle body 4 is held on the two bearing elements 3.

The handle body 4 is biased by a spring into a raised position as shown in FIG. 1. When gripped by the user, the handle body 4 can be pivoted, as shown in FIG. 2. For this purpose, the handle body 4 is rotatably mounted on the bearing elements 3.

In FIG. 3, the roof handle 1 is shown without the roof. A bearing element 3 is shown spaced from the handle body 4. Each bearing element 3 comprises a plug-in part 30 which can be inserted into the roof 2 and on which a latching means 32, in particular a flexible spring bar, is provided, by means of which the bearing element 3 can be mounted without tools. The bearing element 3 can also be fixed to the roof 2 by other fixing means. The bearing element 3 further comprises a flange 31 abutting the surface of the roof 2, from which a bearing block 33 projecting into the interior of the vehicle is arranged. An axis 5 is provided on the bearing block 33, on which the handle body 4 is rotatably mounted. In the region of the bearing block 33, at least in the case of one bearing element 3, there are two sliding contacts 14 which are used for the electrical power supply.

The electrical sliding contacts 14 are connected via lines in the bearing element 3 to plug-in contacts 13, to which sockets 12 can be plugged, which can be connected to lines 11 for the power supply. The plug-in part 30 thus serves not only to mechanically fix the bearing element 3, but also to supply power, in particular in the low-voltage range.

The handle body 4 has a groove-shaped receptacle 6 on one surface, which is preferably arranged on an edge of the handle body 4. An optical waveguide 7 is inserted into the groove-shaped receptacle 6, which is adapted to the contour of the handle body 4 and is shaped like a bow. Light can be emitted into the optical waveguide 7 by an illuminating means 10 to illuminate it.

The illuminating means 10, for example an LED, is mounted on a holder 8 to which a printed circuit board 9 is fixed.

In FIGS. 4A and 4B, the roof handle is shown in a raised position, with the holder 8 shown in an assembled position in FIG. 4A. The holder 8 has an end face flush with an end face of the handle body 4.

As shown in FIG. 4B, the handle body has a recess 16 in the area of the bearing element 3 with the power supply, in which a receptacle 17 is provided. The printed circuit board 9 and the holder 8 may be inserted into the step-shaped receptacle 17, with the illuminating means 10 arranged so that it is then disposed adjacent to an end face of the optical waveguide 7.

The positioning of the optical waveguide on the illuminating means 10 is shown in detail in FIGS. 5A and 5B. The optical waveguide 7 positioned by the groove-shaped receptacle 6 is positioned with an end face on the illuminating means 10 so that the illuminating means 10, for example as an LED, emits light into the optical waveguide 7, which then emits light over the entire length.

The printed circuit board 9 has two contacts 15 on an upper side, which are movable together with the handle body 4 and the printed circuit board 9. In the raised position, the contacts 15 are in contact with the sliding contacts 14 on the bearing block 33 of the bearing element 3. For this purpose, the contacts 15 and the sliding contacts 14 can be in contact with each other with pretension.

FIG. 6 shows the circuit board 9 with the two contacts 15 in detail. The printed circuit board 9 on the holder 8 is designed with the illuminating means 10 as a ready-to-mount unit which can be inserted into the receptacle 17 on the handle body 4.

FIG. 7 shows the holder 8 with the optical waveguide 7, which is shaped like a bow and thus reproduces the contour of the handle body 4, which is thus more visible.

Figure 8:
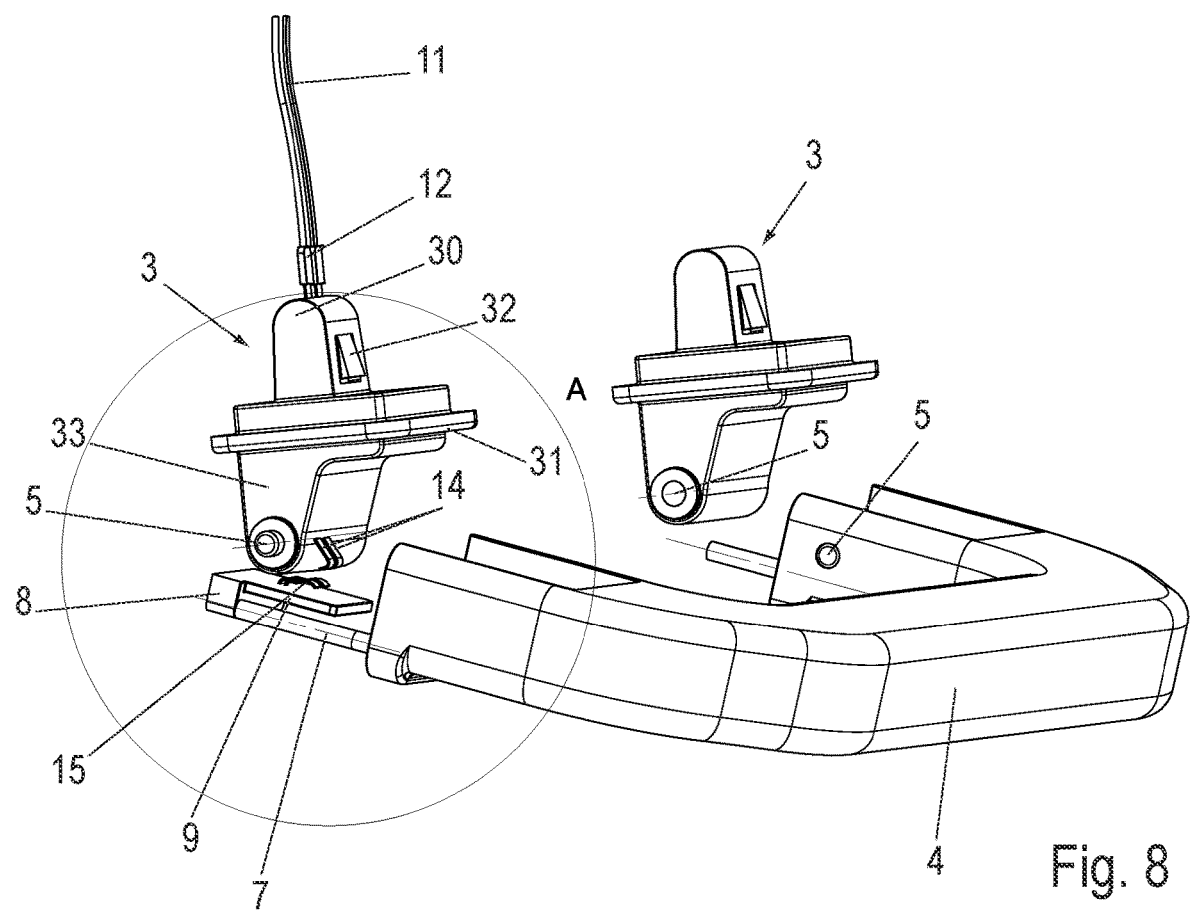
FIG. 8 shows a view of the roof handle with the handle body partially folded down.

In FIG. 8, the handle body 4 is shown in a slightly folded down position. It can be seen that by pivoting the handle body 4 about the axes 5 on the bearing elements 3, the movable contacts 15 are pivoted relative to the bearing block 33 with the sliding contacts 14. As a result, the contacts 15 move away from the sliding contacts 14 until the contact is broken, so that the illuminating means 10 are switched off by folding down the handle body 4. When the user releases the handle body 4 again, a spring element raises the handle body 4 upwards so that the sliding contacts 14 contact the contacts 15 again and the illuminating means 10 is switched on again.

In the illustrated embodiment, only one illuminating means 10 is provided on the bearing element 3 for an optical waveguide 7. It is of course also possible to provide two or more illuminating means which radiate light into one or more optical waveguides 7. In addition, an illuminating means 10 can optionally also be provided on both bearing elements 3.

In the illustrated embodiment example, the power supply of the illuminating means 10 is provided via sliding contacts 14. It is also possible to use other contacts, for example plug-in contacts, materially connected contacts or clamping contacts. In that case, preferably only one cable bushing for the line 11 for the power supply is provided on the bearing element 3.

LIST OF REFERENCE SIGNS

1 Roof handle
2 Roof
3 Bearing element

4 Handle body
5 Axis
6 Groove-shaped receptacle
7 Optical waveguide
8 Holder
9 Printed circuit board
10 Illuminating means
11 Line
12 Socket
13 Plug-in contact
14 Sliding contact
15 Contact
16 Recess
17 Receptacle
30 Plug-in part
31 Flange
32 Latching means
33 Bearing block

What is claimed is:

1. A roof handle for a vehicle, comprising:
two bearing elements which are configured to be fixed to a roof of a vehicle,
a handle body mounted on the bearing elements such that the handle body can be pivoted between a raised position and a lowered holding position,
a line for a power supply provided on at least one of the bearing elements,
an illuminating means on the handle body; and
an optical waveguide,
wherein the line, in a folded-up position of the handle body, is connected via contacts to the illuminating means and wherein the illuminating means is configured for irradiating light into the optical waveguide.

2. The roof handle according to claim 1, wherein the optical waveguide is arranged in a receptacle of the handle body.

3. The roof handle according to claim 1, wherein the optical waveguide is made of a transparent or translucent material.

4. The roof handle according to claim 1, wherein at least one sliding contact is provided on the at least one bearing element and bears against a movable contact which is fixed to the handle body.

5. The roof handle according to claim 4, wherein the movable contact is arranged on a printed circuit board to which an illuminating means is fixed.

6. The roof handle according to claim 5, wherein the printed circuit board is inserted in a receptacle on the handle body.

7. The roof handle according to claim 1, wherein a cable bushing is provided on the at least one bearing element and the line for the power supply is connected to a printed circuit board on the handle body via a contact element.

8. The roof handle according to claim 1, wherein the illuminating means is configured to be switched off by folding down the handle body.

9. The roof handle according to claim 1, wherein the optical waveguide is circular in cross-section.

10. The roof handle according to claim 1, wherein the optical waveguide is arranged in the form of a bow.

11. The roof handle according to claim 1, wherein the handle body has a groove-shaped receptacle into which the optical waveguide is inserted and is arranged substantially flush with a surface of the handle body.

* * * * *